(12) United States Patent
Kim

(10) Patent No.: US 8,446,624 B2
(45) Date of Patent: May 21, 2013

(54) METHOD OF SETTING DRIVER PROGRAM OF IMAGE PROCESSING DEVICE AND IMAGE PROCESSING SYSTEM WITH TRANSPARENT FUNCTION

(75) Inventor: Yang-moon Kim, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 120 days.

(21) Appl. No.: 12/843,242

(22) Filed: Jul. 26, 2010

(65) Prior Publication Data

US 2010/0293489 A1  Nov. 18, 2010

Related U.S. Application Data

(63) Continuation of application No. 11/048,931, filed on Feb. 3, 2005, now Pat. No. 7,787,146.

(30) Foreign Application Priority Data

Mar. 10, 2004  (KR) .................................. 2004-16222

(51) Int. Cl.
*G06F 3/12*  (2006.01)
*H04N 1/00*  (2006.01)

(52) U.S. Cl.
USPC .......... 358/1.15; 358/1.6; 358/1.13; 358/1.18

(58) Field of Classification Search
USPC .................. 358/1.13, 1.15, 1.9, 474, 1.1, 1.6, 358/1.12, 1.14, 1.18, 1.16, 1.17, 505, 487, 358/490, 497; 715/700; 345/594, 592, 428; 719/321, 322, 323, 324, 325, 326, 327; 382/312; 347/3, 5; 399/81
See application file for complete search history.

(56) References Cited

U.S. PATENT DOCUMENTS 6,359,631 B2 * 3/2002 DeLeeuw ...................... 345/629
2005/0205671 A1 * 9/2005 Gelsomini et al. ............ 235/384

FOREIGN PATENT DOCUMENTS

| KR | 1997-20161 | 5/1997 |
| KR | 2002-54425 | 7/2002 |
| KR | 2002-81714 | 10/2002 |
| KR | 2003-44059 | 6/2003 |

OTHER PUBLICATIONS

Korean Office Action dated May 31, 2007 issued in KR Application No. 2004-16222.

* cited by examiner

*Primary Examiner* — Dov Popvici
(74) *Attorney, Agent, or Firm* — Stanzione & Kim, LLP

(57) ABSTRACT

A method of setting a user interface of a driver program of an image processing device includes applying a transparent setting to display the driver program in a transparent state on a display device to the driver program, and displaying the driver program with the applied transparent function on the display device when an application program operates the driver program. The driver program does not block an acquired result of the application program, and a user is able to perform a scanning operation at an optimum environment by adjusting a transparency level of the driver program displayed over the application program.

50 Claims, 6 Drawing Sheets

METHOD OF SETTING DRIVER PROGRAM OF IMAGE PROCESSING DEVICE AND IMAGE PROCESSING SYSTEM WITH TRANSPARENT FUNCTION

CROSS-REFERENCE TO RELATED APPLICATIONS

This application is a Continuation Application of U.S. patent application Ser. No. 11/048,931, filed Feb. 3, 2005 now U.S. Pat. No. 7,787,146 in the U.S. Patent and Trademark Office, which claims priority from Korean Patent Application No. 2004-16222 filed on Mar. 10, 2004, in the Korean Intellectual Property Office, the disclosure of which is incorporated herein in its entirety and by reference.

BACKGROUND OF THE INVENTION

1. Field of the Invention

The present general inventive concept relates to a method of setting a driver program that drives an image processing device, and more particularly, to a method of setting a user interface of a driver program that allows the driver program not to interfere with an acquisition result of an application program operated by a user when the driver program of the image processing device is displayed over the application program.

2. Description of the Related Art

Generally, a scanner and other types of image processing devices, such as a multifunction device with a scanning unit, scan a document and convert the scanned result into image data in a predetermined file format, such as a JPEG or a TIFF format, which is, in turn, transmitted to a host, such as a computer. In the computer, a driver program for driving the scanner is installed, and an application program for processing the image data generated by the scanner can also be installed. Examples of the application program are the Photoshop software program by Adobe Systems Incorporated, the Paint software program, and the like. Meanwhile, these application programs are not capable of having direct access to the image data read by the scanner, but are capable of accessing the image data in the file format. In this case, in order for the application program to acquire the image data, there is an inconvenience of requiring several sequential steps to acquire the image data. First, the image data of the document is stored in the file format by operating a scanner program. Then, the scanner program is terminated, and the application program is subsequently operated to access the image data saved in the file format.

Currently, the aforementioned application programs access the image data read by the scanner through a tool-kit without an important name (TWAIN) driver in an operating system, so that the application programs can directly access the read image data.

FIG. 1 is a diagram illustrating a conventional scanning system including a host 100 for processing image data scanned by a scanner 200.

Referring to FIG. 1, the host 100 includes a storage medium 110 having an application program 113, a TWAIN driver 112 and a driver program 111, a control block 120 having a central processing unit (CPU) and a random access memory (RAM), an input device 130, and a display unit 140. In FIG. 1, the application program 113, the TWAIN driver 112 and the driver program 111 are abbreviated respectively as APP, TWAIN and DRIVER.

When the application program 113 for processing the image data, e.g., the Photoshop application program, calls the image data, the application program 113 controls the scanner 200 through the driver program 111 to scan a document (not shown).

The driver program 111, the TWAIN driver 112 and the application program 113 included in the storage medium 110 of the host 100 are operated under a typical Windows operating system or a Linux operating system.

The scanner 200 is operated by the driver program 111 and inputs a scanned result, i.e., the image data, to the storage medium 110. At this time, the image data is input to the TWAIN driver 112 through the driver program 111, and the application program 113 can directly acquire the image data through the TWAIN driver 112. That is, it is unnecessary for the application program 113 to access the image data stored in a file format created by an additional scanner program.

FIG. 2 is a diagram illustrating an exemplary result obtained as an application program window 213 and a TWAIN driver window 212 are displayed on a screen.

Referring to FIGS. 1 and 2, as a user starts an application program window 213, if the user wishes to acquire the image data through the application program window 213, a TWAIN driver window 212 that interfaces the driver program 111 with the application program 113 is displayed over the application program window 213. Here, the TWAIN driver 112 allows the application program 113 to directly access the image data created by the scanner 200. When the TWAIN driver window 212 is displayed, the user is able to access the image data while the application program 113 operates. However, as illustrated in FIG. 2, the TWAIN driver window 212 blocks the image data displayed by the application program window 213.

The TWAIN driver window 212 includes a control menu 215 for controlling the image data acquired through the application program 113. In particular, the control menu 215 of the TWAIN driver window 212 includes sub-control menus of an image type control menu 215a, a resolution control menu 215b, an image area control menu 215c and an image size control menu 215d. The control menu 215 adjusts the image data as the user sets the various sub-control menus of the control menu 215. The TWAIN driver window 212 also includes a menu bar 216, a scan button 217, and a preview button 218.

In a case in which the user wishes to scan more than one document, the user has a difficulty in confirming a displayed image of the acquired image data. Also, when the user clicks the TWAIN driver window 212 by using the input device 130, such as a mouse, to move the TWAIN driver window 212 into a different position of the screen, the control block 120 starts operating to handle an interruption made by the input device 130 and as a result, there is a delay in processing the image data by the application program window 113.

In a case in which the scanner 200 scans a number of documents consecutively, it may be impossible or difficult to move the position of the TWAIN driver window 212 through the use of the input device 130. Also, when an image of the image data accessed by the application program window 213 is displayed on the screen, the user may have a difficulty in confirming the acquired image data since the TWAIN driver window 212 blocks the displayed image on the screen.

SUMMARY OF THE INVENTION

The present general inventive concept provides a method of setting a user interface of a driver program to impede a driver program from interfering with an acquisition result of an application program operated by a user.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of setting a user interface of a driver program of an image processing device when the driver program is displayed on a display device, the method including applying a transparent setting to display the driver program in a transparent state on the display device onto the driver program, and displaying the driver program with the applied transparent setting on the display device when an application program operates the driver program.

The method may further include setting a transparency level of the transparent setting.

The displaying of the driver program using the applied transparent function on the display device may include displaying a portion of the displayed driver program overlapping with the application program displayed on the display device according to the set transparency level.

The displaying of the driver program using the applied transparent function may also include displaying the driver program with the set transparency level over the displayed application program.

The applying of the transparent setting onto the driver program may include loading the driver program of the image processing device, activating the transparent setting of the loaded driver program, and saving the activated transparent setting into the driver program.

The displaying of the driver program with the applied transparent setting may also include requesting the driver program to operate by the application program, and displaying the user interface of the driver program on the display device according to the set transparency level.

Furthermore, the driver program may be one of a tool-kit without an important name (TWAIN) driver, a windows image acquisition (WIA) driver, and an image and scanner interface standard (ISIS) driver.

The foregoing and/or other aspects and advantages of the present general inventive concept may also be achieved by providing an image processing system applied with a transparent setting, the image processing system including a display device, an image processing device to read image data of a document, and a host having a control block to activate the transparent setting to display a driver program in a transparent state and to apply the transparent setting to the driver program when an application program accessing the image data loads the driver program.

The control block of the host may be capable of setting a transparency level of the transparent setting.

The control block of the host may display a portion of the displayed driver program overlapping with the displayed application program on the display device according to the set transparency level.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
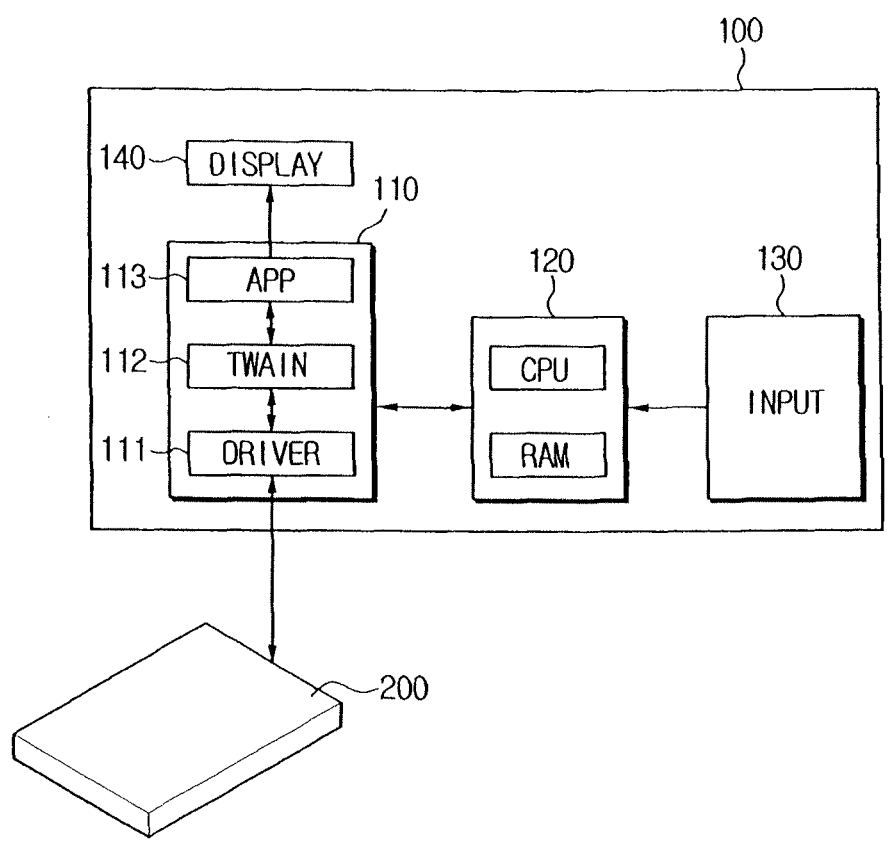
FIG. 1 is a diagram illustrating a conventional scanning system.
Figure 2:
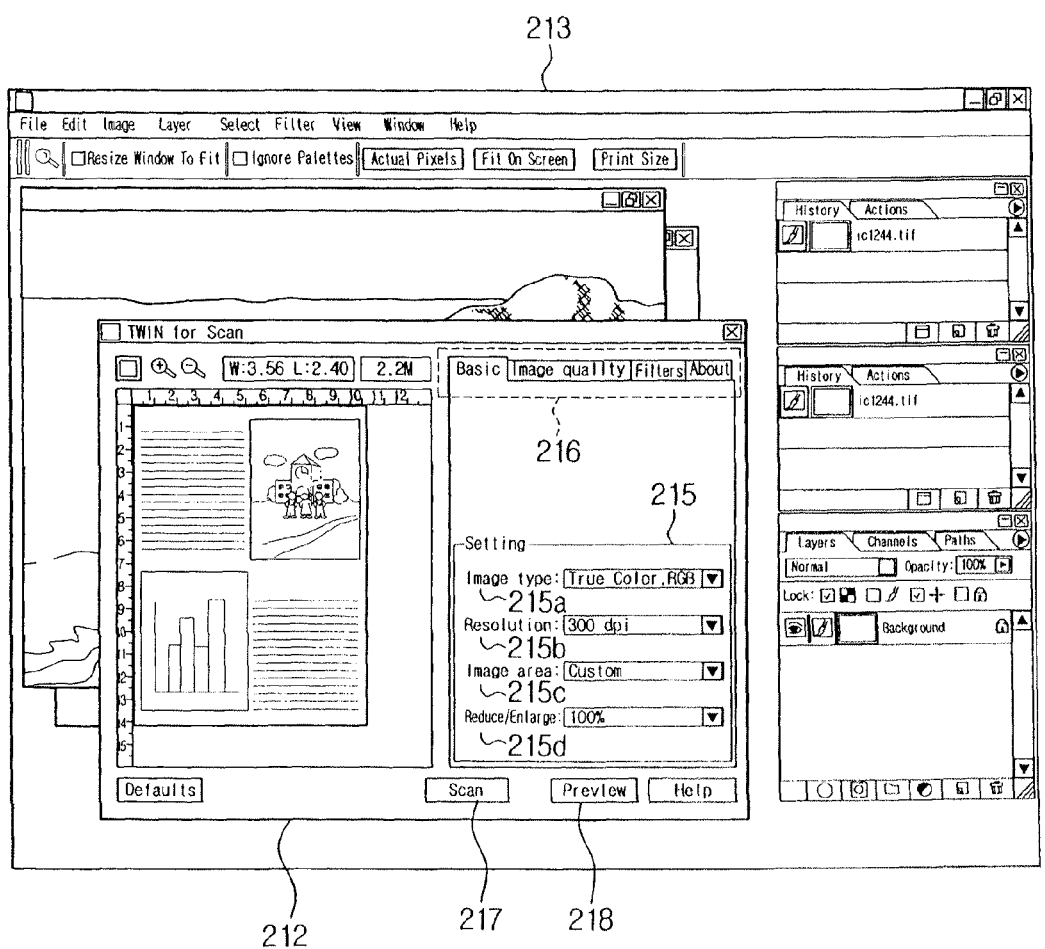
FIG. 2 is a diagram illustrating an application program and a tool-kit without an important name (TWAIN) driver of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
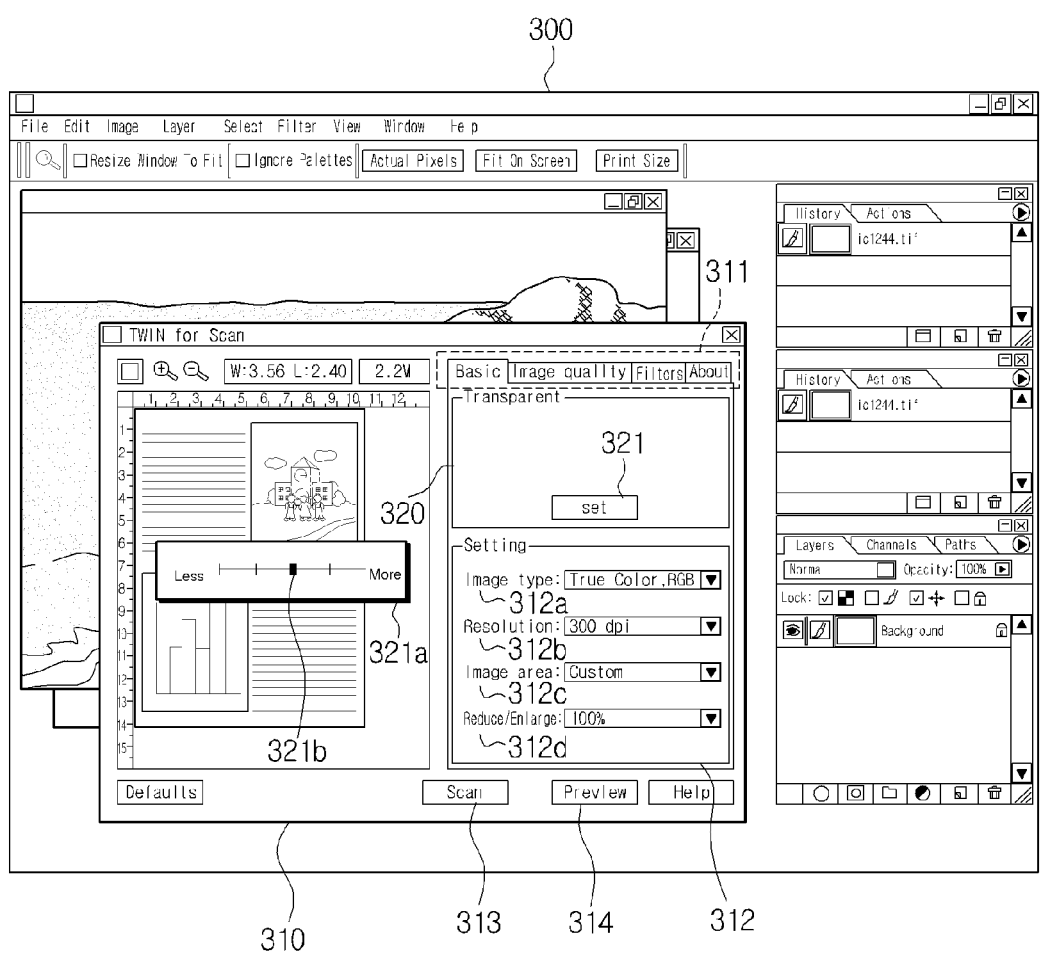
FIG. 3 is a diagram illustrating a tool-kit without an important name (TWAIN) driver according to an embodiment of the present general inventive concept.

FIG. 3 is a diagram illustrating a tool-kit without an important name (TWAIN) driver 310 according to an embodiment of the present general inventive concept.

Referring to FIG. 3, the TWAIN driver 310 appears on a screen on which an application program 300 is displayed when the application program 300 accesses image data obtained through a scanner. The TWAIN driver 310 can include a menu bar 311 including a basic menu to control a color type, a resolution, an area and a size of the image data, a menu to adjust an image quality, a filter menu, and an about menu to provide information regarding the TWAIN driver 310. A number of sub-menus can be included in the basic menu. As illustrated in FIG. 3, a transparent menu 320 to set a transparent setting and a control menu 312 having sub-control menus of an image type control menu 312a, an image resolution control menu 312b, an image area control menu 312c, and an image size control menu 312d.

The transparent menu 320 sets the TWAIN driver 310 displayed over the application program 300 to be displayed in a transparent state or in a translucent state. The transparent or translucent state can be realized by a predetermined operating system having functions of text and geometric figures displayed on the screen, such as Windows operating system developed by Microsoft Corporation, and the like, and in a host computer having a high capacitance storage medium, such as a processor, a random access memory (RAM) or a hard disk drive (HDD), the operating system and the TWAIN driver 310 can be installed on the hard disk drive. Therefore, the operating system installed into the high capacitance storage medium, such as the hard disk drive, drives the TWAIN driver 310 through the processor, and in turn, sets a transparency level of the TWAIN driver 310. The newly set transparency level is applied to a previously set transparency level of the TWAIN driver 310 installed on the hard disk drive.

Also, the transparent menu 320 can have a set button 321 to set the transparency level of the TWAIN driver 310 when the TWAIN driver 310 is displayed over the application program 300. Once a user clicks the set button 321 by using an input device, a set menu 321a to set the transparency level appears on an inner frame or an outer frame of the TWAIN driver 310. The user then sets the transparency level by moving a set bar 321b through the use of the input device, such as a mouse.

The image resolution control menu 312b of the control menu 312 controls a scanning resolution of the image data scanned by the scanner. For example, the image resolution control menu 312b is capable of setting a target document to be scanned in a resolution of approximately 300 dots per inch (dpi), approximately 600 dpi and approximately 1,200 dpi. The image type control menu 312a is capable of setting an image type when the image data acquired by the scanner 200 is displayed on the screen. As illustrated in FIG. 3, the acquired image data can be set to have a true color of a RGB type. The image area control menu 312c allows the user to select a particular area of the scanned image data, and the image size control menu 312d allows the user to increase or decrease the size of an image displayed on the screen corresponding to the image data. As illustrated in FIG. 3, the image size is set to be approximately 100% indicating the size of the original image, and the image size can be greater than or less than approximately 100% to allow the user to view the image on the screen conveniently. The TWAIN driver 310 can also include a scan button 313 to control the scanner to scan the image data, and a preview button 314 to allow the user to preview the image corresponding to the image data scanned by the scanner.

Figure 4:
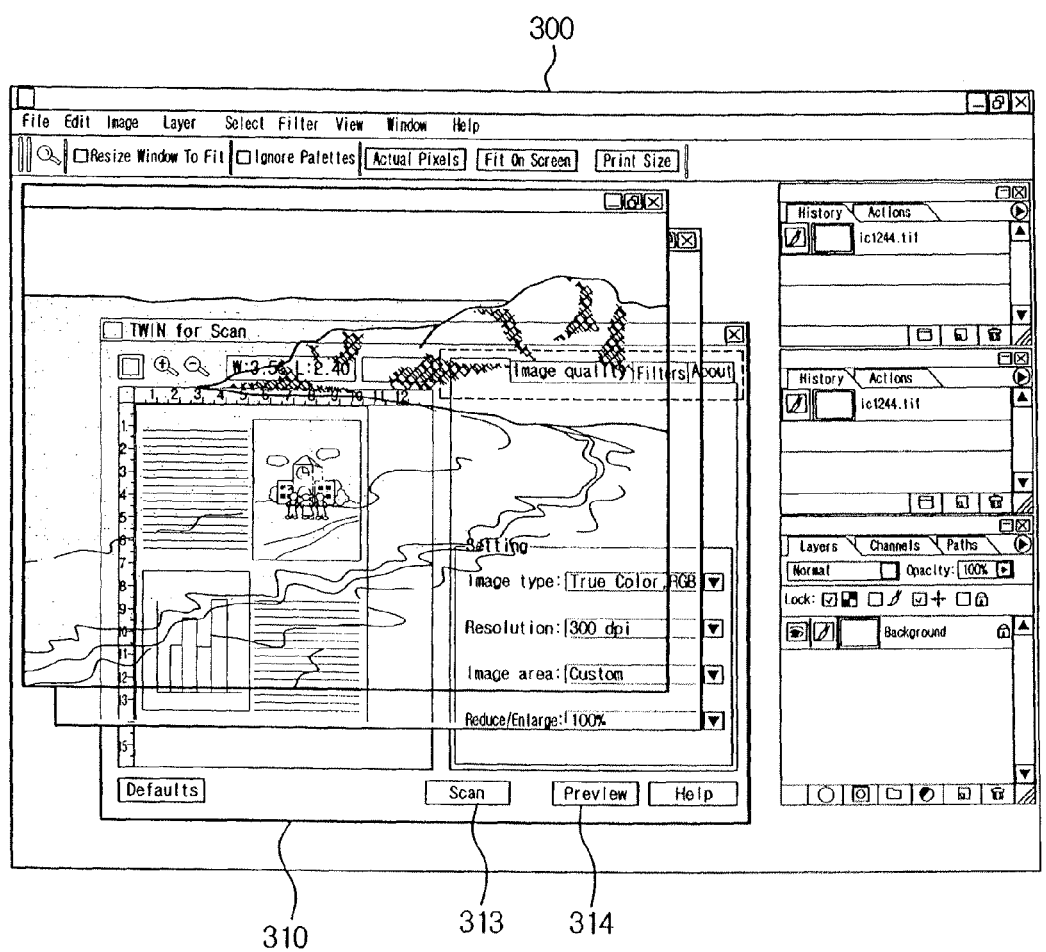
FIG. 4 is a diagram illustrating the TWAIN driver of FIG. 3 in which a transparent setting is set.

FIG. 4 is a diagram illustrating the TWAIN driver 310 of FIG. 3 in which the transparent setting is set. After the transparent setting is applied to the TWAIN driver 310, a portion of the TWAIN driver 310 that is displayed over the application program 300 becomes transparent or translucent and thus, the displayed image of the image data transferred from the scanner is not blocked by the TWAIN driver 310. As a result of this transparently or translucently transformed TWAIN driver 310, the user is able to directly confirm a portion of the image overlapping with the TWAIN driver 310. Even though the TWAIN driver 310 is in a transparent or translucent state, the user is able to adjust a quality of the image by controlling the image size, the resolution and the like through using the various sub-control menus 312a to 312d of the control menu 312. Although this embodiment of the present general inventive concept is described using the TWAIN driver, it is possible to apply this transparent function to a windows image acquisition (WIA) driver by Microsoft, an image and scanner interface standard (ISIS) driver, or any other acceptable alternative. Also, in addition to the scanner, such an image processing device as a printer, a digital photocopier, a multifunction apparatus, and the like, can alternatively be used with the transparent function, so that a result acquired by the application program is not blocked when being displayed on the screen.

Figure 5:
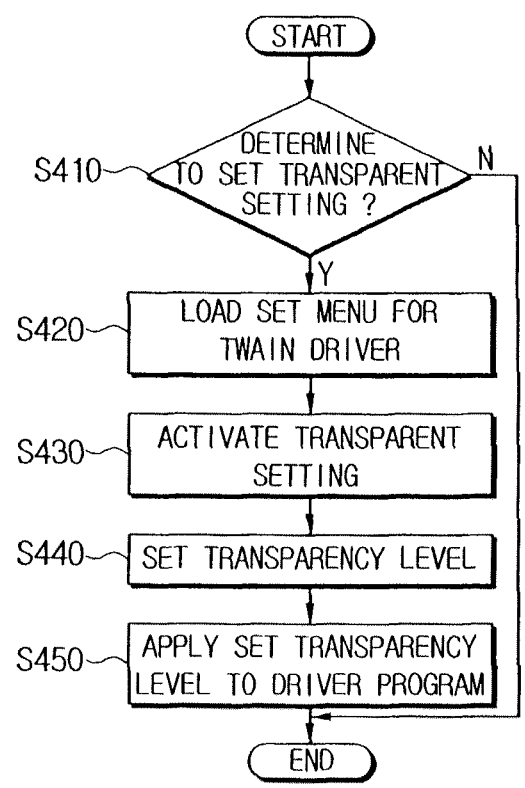
FIG. 5 is a flowchart illustrating a method of setting a transparent setting through a TWAIN driver according to an embodiment of the present general inventive concept.

FIG. 5 is a flowchart illustrating a method of setting a transparent setting of a TWAIN driver according to an embodiment of the present general inventive concept.

Referring to FIGS. 3-5, at operation S410, when a user desires to acquire image data scanned by the scanner 200 through the application program 300, the user determines whether to set the transparent setting. Then, at operation S420, the user loads the TWAIN driver 310 capable of turning on or off the transparent setting on the screen, or the application program 300 automatically loads the TWAIN driver 310.

Next, at operation S430, the user clicks a check box of the transparent menu 320 that allows the user to turn on or off the transparent setting by using the input device, e.g., a mouse, whereby the transparent setting is activated. Thereafter, at operation S440, the user can click the set button 321 to load the set menu 321a on the screen and then, set the transparency level using the loaded set menu 321a. At operation S450, the user can close the set menu 321a with the set transparency level in order to apply the set transparency level to the TWAIN driver 310. Although not illustrated, there may be a case in which the TWAIN driver 310 has an application key to apply the set transparency level of the TWAIN driver, and in this case, the change in the set transparency level of the TWAIN driver is applied by clicking the application key. As illustrated in FIG. 4, when the transparent setting is applied to the TWAIN driver 310, the transparent or translucent TWAIN driver 310 is displayed on the application program 300.

Figure 6:
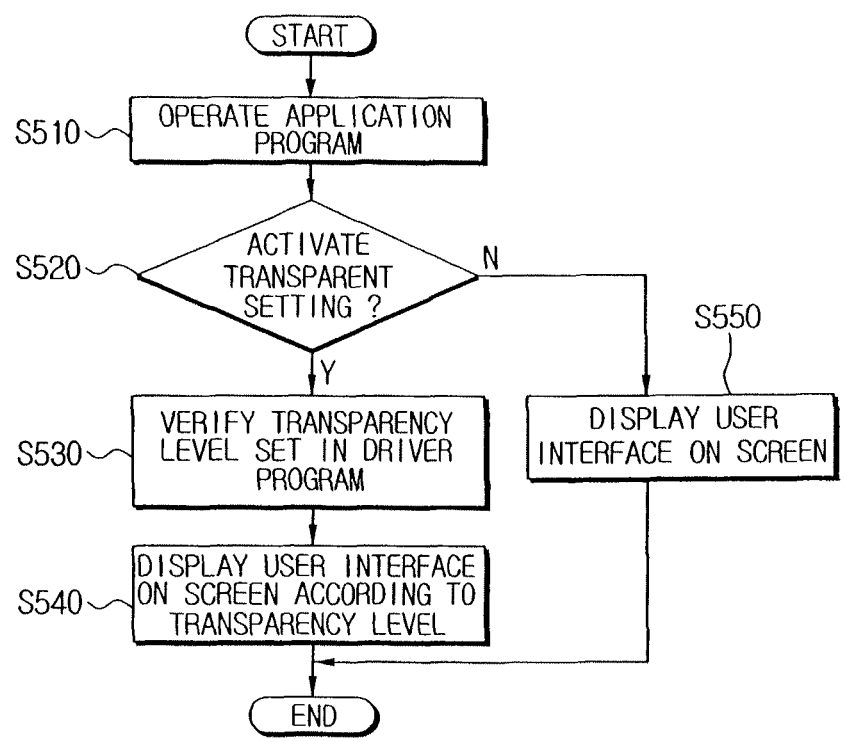
FIG. 6 is a flowchart illustrating a method of displaying a TWAIN driver on a screen based on a transparent setting according to an embodiment of the present general inventive concept.

FIG. 6 is a flowchart illustrating a method of displaying the TWAIN driver 310 with the transparent setting according to an embodiment of the present general inventive concept.

Referring to FIGS. 3, 4, and 6, at operation S510, a user operates the application program 300, which acquires the image data from the scanner and processes the acquired image data thereafter. Examples of the application program 300 are Photoshop, Paint Shop Pro, and the like, which can be operated by a driver selected from a group including the TWAIN driver 310, the WIA driver, and the ISIS driver. Currently, the TWAIN 310 driver is the most commonly used driver in image processing devices and drivers corresponding to the image processing devices. Although the embodiments of FIGS. 3-6 of the present general inventive concept describe the TWAIN driver 310 as an exemplary driver, the WIA driver and the ISIS driver can be similarly applied.

Next, at operation S520, the TWAIN driver 310 determines whether the user activates the transparent setting. If the transparent setting is activated, at operation S530, the TWAIN driver 310 verifies the set transparency level with respect to the transparent setting set by the user. Afterwards, the TWAIN driver 310, at operation S540, coverts a state of the TWAIN driver 310 displayed on the screen into a transparent or translucent state according to the set transparency level. Conversely, if the TWAIN driver 310 is not set with the transparent setting, at operation S550, the TWAIN driver 310 is displayed directly over the application program in an opaque state.

According to the present general inventive concept, there is provided an effect that an acquired result by an application program operated by a user is not blocked by a driver program, and a scanning operation can be operated at an optimum environment by controlling a transparency level of the driver program displayed over the application program. Although the present general inventive concept describes in detail a transparent setting of a TWAIN driver based on a scanner, image processing devices such as a printer, a photocopier, a multifunction apparatus, and the like can be applied similarly as an alternative to the scanner, and a WIA driver, an ISIS driver, and the like can be applied similarly as an alternative to the TWAIN driver.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of setting a user interface of a driver program of an image processing device when the driver program is displayed on a display device, the method comprising:
   applying a transparent setting to display the driver program in a transparent state on the display device;
   displaying the driver program with the applied transparent setting on the display device when an application program operates the driver program; and
   displaying an image on the display device at least partially behind the driver program such that the image is entirely visible, such that the driver program allows a user to visibly alter the image in real-time.

2. The method of claim 1, further comprising:
setting a transparency level of the transparent setting.

3. The method of claim 2, wherein the displaying of the driver program with the applied transparent setting on the display device comprises:
displaying a portion of the displayed driver program overlapping with the application program displayed on the display device according to the set transparency level.

4. The method of claim 1, wherein the displaying of the driver program with the applied transparent setting comprises:
displaying the application program; and
displaying the driver program set with a transparency level over the displayed application program.

5. The method of claim 1, wherein the applying of the transparent setting to the driver program comprises:
loading the driver program of the image processing device; and
activating the transparent setting of the loaded driver program.

6. The method of claim 1, wherein the displaying of the driver program with the applied transparent setting comprises:
requesting the driver program to operate by the application program; and
displaying the user interface of the driver program on the display device according to a transparency level set in the driver program.

7. The method of claim 1, wherein the driver program comprises one of a tool-kit without an important name TWAIN driver, a windows image acquisition WIA driver, and an image and scanner interface standard ISIS driver.

8. A method of controlling a driver program and an application program displayed on a display, the method comprising:
displaying a first window on the display;
displaying a second window on the display; and
changing a characteristic of the second window according to data of the first window when the first window and the second window are displayed on the display simultaneously to both be fully visible regardless of an overlap.

9. The method of claim 8, wherein the displaying of the second window comprises displaying the second window on at least a portion of the first window displayed on the display so that the first window and the second window overlap at the at least a portion.

10. The method of claim 8, wherein the first window corresponds to the application program and the second window corresponds to the driver program.

11. The method of claim 8, wherein the changing of the characteristic of the second window comprises selecting one of a transparent setting and a non-transparent setting.

12. The method of claim 8, wherein the changing of the characteristic of the second window comprises selecting one of a translucent setting and a non-translucent setting.

13. The method of claim 8, wherein the changing of the characteristic of the second window comprises changing the characteristic of the second window when data is displayed on at least one portion of the first window.

14. The method of claim 8, wherein at least one portion of the first window is covered by the second window.

15. The method of claim 14, wherein the at least one portion of the first window is exposed through the second window when the characteristic of the second window is changed.

16. The method of claim 8, wherein the changing of the characteristic of the second window comprises:
determining whether a portion of the second window is overlapping the first window displayed on the display; and
when the portion of the second window is overlapping the first window, controlling the portion of the second window to be transparent or translucent.

17. The method of claim 16, wherein the changing of the characteristic of the second window further comprises:
setting a level of transparency of the second window.

18. The method of claim 17, wherein the controlling of the portion of the second window to be transparent or translucent comprises controlling the portion of the second window to be transparent or translucent according to the set level of transparency.

19. The method of claim 8, wherein the second window corresponds to one of a tool-kit without an important name TWAIN driver, a windows image acquisition WIA driver, and an image and scanner interface standard ISIS driver.

20. The method of claim 8, further comprising:
inputting image data from an image reading device to the application program through the driver program;
displaying the application program including an image corresponding to the image data in the first window on the display; and
displaying a graphical user interface of the driver program in the second window on the display, wherein at least a portion of the graphical user interface is transparent or translucent;

21. The method of claim 20, further comprising:
setting a transparency level of the graphical user interface.

22. The method of claim 21, wherein the displaying of the graphical user interface of the driver program in the second window on the display comprises:
displaying the graphical user interface with the at least a portion thereof transparent or translucent according to the set transparency level of the graphical user interface.

23. The method of claim 20, wherein an overlapping portion of the graphical user interface overlaps with a portion of the application program, and the overlapping portion of the graphical user interface is transparent or translucent.

24. The method of claim 8, wherein the displaying of the second window comprises:
displaying the second window on a portion of the first window; and
displaying data on the portion of the first window so that the data is shown through an image of the second window.

25. The method of claim 24, wherein the data is scanned image data generated according to the second window.

26. An image processing system applied with a transparent setting, comprising:
a display device;
an image processing device to read image data of a document; and
a host having a control block to apply a transparent function to display a driver program of the image processing device in a transparent state to the driver program when an application program accessing the image data loads the driver program of the image processing device, such that the image data is displayed on the display device at least partially behind the driver program such that the image data is entirely visible, wherein the driver program allows a user to visibly after the image data in real-time.

27. The image processing system of claim 26, wherein the control block of the host is capable of setting a transparency level of the transparent setting.

28. The image processing system of claim 27, wherein the control block of the host displays a portion of the displayed driver program overlapping with the application program on the display device according to the set transparency level.

29. An image processing system including an image processing unit, an image reading unit and a display, the image processing unit comprising:
- a first window displayed on the display; and
- a second window displayed on the display comprising:
  - a characteristic adaptor to changer a characteristic of the second window according to data of the first window when the first window and the second window are simultaneously displayed on the display to both be fully visible regardless of an overlap.

30. The image processing system of claim 29, wherein the characteristic adaptor comprises:
- a transparency setting activator to activate a transparency setting of the second window; and
- a transparency level menu to set a level of transparency of the transparency setting of the second window.

31. The image processing system of claim 30, wherein a portion of the second window displayed on the display is overlapping a portion of the first window displayed on the display, and when the transparency setting of the second window is activated, the portion of the second window overlapping the portion of the first window becomes transparent or translucent according to the transparency level set by the transparency level menu.

32. The image processing system of claim 30, wherein when the transparency setting of the second window is activated, the second window becomes transparent according to the transparency level set by the transparency level menu.

33. The image processing system of claim 30, wherein the transparency setting activator comprises a checkbox.

34. The image processing system of claim 30, wherein the transparency level menu comprises a transparency level bar to set the transparency level.

35. The image processing system of claim 29, wherein the first window corresponds to an application program to process in put image data, and the second window corresponds to a driver program to drive the image reading unit to input the image data to the application program.

36. The image processing system of claim 35, wherein the driver program comprises one of a tool-kit without an important name TWAIN driver, a windows image acquisition WIA driver, and an image and scanner interface standard ISIS driver.

37. An image processing system comprising:
display; and
- a host including a first program to display an image corresponding to input image data on the display, and a second program to display a graphical user interface, GUI, on the display, wherein when a portion of the GUI obstructs the image displayed by the first program, the obstructing portion of the GUI becomes translucent or transparent, such that the GUI allows a user to visibly after the image in real-time.

38. The image processing system of claim 37, wherein the graphical user interface comprises a transparency level menu to allow the user to control a level of transparency of the obstructing portion of the graphical user interface.

39. A non-transitory computer-readable medium encoded with a driver program to drive an image reading device including a graphical user interface GUI to control the driver program, the GUI comprising:
- a transparent menu to activate and control a transparent setting of the GUI to control at least a portion of the GUI to be transparent or translucent such that an image is displayed at least partially behind the GUI such that the image is entirely visible, wherein the GUI allows a user to visibly after the image in real-time.

40. The computer-readable medium of claim 39, wherein the transparent menu comprises:
- a set button to load a set menu to set a transparency level of the transparent setting of the GUI, and the at least the portion of the GUI is controlled to be transparent or translucent according to the set transparency level.

41. The computer-readable medium of claim 40, wherein the set menu comprises:
- a set bar to select the transparency level from a range of transparency levels.

42. The computer-readable medium of claim 39, wherein the transparent menu comprises:
- a transparent setting activator to turn on or off the transparent setting of the GUI.

43. The computer-readable medium of claim 42, wherein the transparent setting activator comprises a checkbox.

44. The computer-readable medium of claim 39, wherein an overlapping portion of the GUI obstructs another program, and the overlapping portion is controlled to be transparent or translucent.

45. The computer-readable medium of claim 39, wherein all of the GUI is controlled to be transparent or translucent.

46. A non-transitory computer readable storage medium containing a method of controlling a driver program displayed on a display at the same time as an application program, the method comprising operations of:
- displaying a first window on the display;
- displaying a second window on the display; and
- changing a characteristic of the second window according to data of the first window when the first window and the second window are displayed on the display simultaneously to both be fully visible regardless of an overlap.

47. The computer readable storage medium of claim 46, wherein the operation of changing the characteristic of the second window comprises:
- determining whether a portion of the second window is overlapping the application program on the display; and
- when the portion of the second window is overlapping the application program, controlling the portion of the second window to be transparent or translucent.

48. The computer readable storage medium of claim 47, wherein the operation of changing the characteristic of the second window further comprises:
- setting a level of transparency of the second window.

49. The computer readable storage medium of claim 48, wherein the controlling of the portion of the second window to be transparent or translucent comprises:
- controlling the portion of the second window to be transparent or translucent according to the set level of transparency.

50. The computer readable storage medium of claim 46, wherein the second window corresponds to the driver program comprising one of a tool-kit without an important name TWAIN driver, a windows image acquisition WIA driver, and an image and scanner interface standard ISIS driver.

* * * * *